United States Patent
Jones et al.

(10) Patent No.: US 9,981,429 B2
(45) Date of Patent: *May 29, 2018

(54) PRESS MOULDING METHOD

(71) Applicant: Gurit (UK) Ltd., Newport, Isle of Wight (GB)

(72) Inventors: Daniel Thomas Jones, Cowes (GB); Stephen Patrick Main, Southampton (GB); Martin James Starkey, Brightstone (GB); Peter Jennings, Newport (GB); Gregory Aratoon, Ventnor (GB)

(73) Assignee: GURIT (UK) LTD., Newport, Isle of Wright (GB)

( * ) Notice: Subject to any disclaimer, the term of this patent is extended or adjusted under 35 U.S.C. 154(b) by 588 days.

This patent is subject to a terminal disclaimer.

(21) Appl. No.: 14/404,664

(22) PCT Filed: May 30, 2013

(86) PCT No.: PCT/EP2013/061195
§ 371 (c)(1),
(2) Date: Dec. 1, 2014

(87) PCT Pub. No.: WO2013/178755
PCT Pub. Date: Dec. 5, 2013

(65) Prior Publication Data
US 2015/0115505 A1    Apr. 30, 2015

(30) Foreign Application Priority Data

May 30, 2012  (GB) .................................. 1209618.6
Nov. 1, 2012  (GB) .................................. 1219675.4

(51) Int. Cl.
B29C 70/46    (2006.01)
B29C 43/18    (2006.01)
(Continued)

(52) U.S. Cl.
CPC ............ *B29C 70/465* (2013.01); *B29C 43/00* (2013.01); *B29C 43/18* (2013.01); *B29C 43/203* (2013.01);
(Continued)

(58) Field of Classification Search
CPC .............................. B29C 70/46; B29C 70/465
See application file for complete search history.

(56) References Cited

U.S. PATENT DOCUMENTS 4,025,686 A    5/1977   Zion
5,585,061 A    12/1996  Takahisa et al.
(Continued)

FOREIGN PATENT DOCUMENTS

EP    0237871 A1    9/1987
GB    2465159 A     5/2010
WO    2010150065 A1 12/2010

OTHER PUBLICATIONS

International Preliminary Report on Patentability and Written Opinion dated Dec. 2, 2014 in International Patent Application No. PCT/EP2013/061195.

*Primary Examiner* — Benjamin A Schiffman

(57) ABSTRACT

A method of press molding a molding material to form a molded part of fiber-reinforced resin matrix composite material, the method comprising the steps of:
i. providing a mold tool having a lower mold part and an upper mold part, the upper mold part having a first molding surface for molding a first molded surface of the molded part and the lower mold part having a second molding surface for molding a second molded surface of the molded part;
ii. providing a multilaminar panel of molding material comprising at least one layer of fibers and at least one layer of resin, the multilaminar panel having first and second opposite major surfaces;
(Continued)

iii. locating the molding material in the mold tool;

iv. progressively closing the mold tool to define a substantially closed mold cavity containing the molding material, the closing step including:

a. a preliminary closing phase to achieve mutual engagement between the lower and upper mold parts, b. a secondary closing phase after engagement between the lower and upper mold parts with the mold tool partially closed to define a closed intermediate cavity containing the molding material, the closed intermediate cavity being larger than the molded part and the first molding surface of the upper mold part being spaced from the first major surface by a spacing distance, in the secondary phase air being at least partially evacuated from the closed intermediate cavity while the first molding surface of the upper mold part is spaced from the first major surface to provide a vacuum pressure, and c. a tertiary closing phase after the vacuum pressure has been provided in the closed intermediate cavity, the tertiary phase having:

I. a first stage prior to both the first molding surface contacting the first major surface and the second molding surface contacting the second major surface, and II. a second compression stage after both the first molding surface has contacted the first major surface and the second molding surface has contacted the second major surface, the closure speed of relative movement between the lower and upper mold parts being higher in the first stage than in the second compression stage;

v. applying pressure to the molding material in the mold cavity to configure the molding material in a fully molded shape; and vi. substantially fully curing the resin to form a molded part from the molding material.

32 Claims, 9 Drawing Sheets

(51) Int. Cl.
  *B29C 70/34* (2006.01)
  *B29C 70/66* (2006.01)
  *B29C 70/08* (2006.01)
  *B29C 43/00* (2006.01)
  *B29C 70/44* (2006.01)
  *B29C 43/20* (2006.01)
  B29C 43/56 (2006.01)
  B29K 63/00 (2006.01)
  B29K 105/08 (2006.01)
  B29K 307/04 (2006.01)
  B29K 309/08 (2006.01)
  B29L 9/00 (2006.01)
  B29L 31/30 (2006.01)

(52) U.S. Cl.
  CPC .......... *B29C 70/086* (2013.01); *B29C 70/345* (2013.01); *B29C 70/443* (2013.01); *B29C 70/46* (2013.01); *B29C 70/467* (2013.01); *B29C 70/66* (2013.01); *B29C 43/20* (2013.01); B29C 2043/563 (2013.01); B29K 2063/00 (2013.01); B29K 2105/0872 (2013.01); B29K 2105/0881 (2013.01); B29K 2307/04 (2013.01); B29K 2309/08 (2013.01); B29L 2009/00 (2013.01); B29L 2031/3005 (2013.01)

(56) References Cited

U.S. PATENT DOCUMENTS 6,139,942 A * 10/2000 Hartness ............... B29B 15/105
                                                    428/297.4
2006/0220273 A1   10/2006 Armstrong et al.
2012/0038081 A1 *  2/2012 Kendall ............... B29C 70/465
                                                    264/257

* cited by examiner

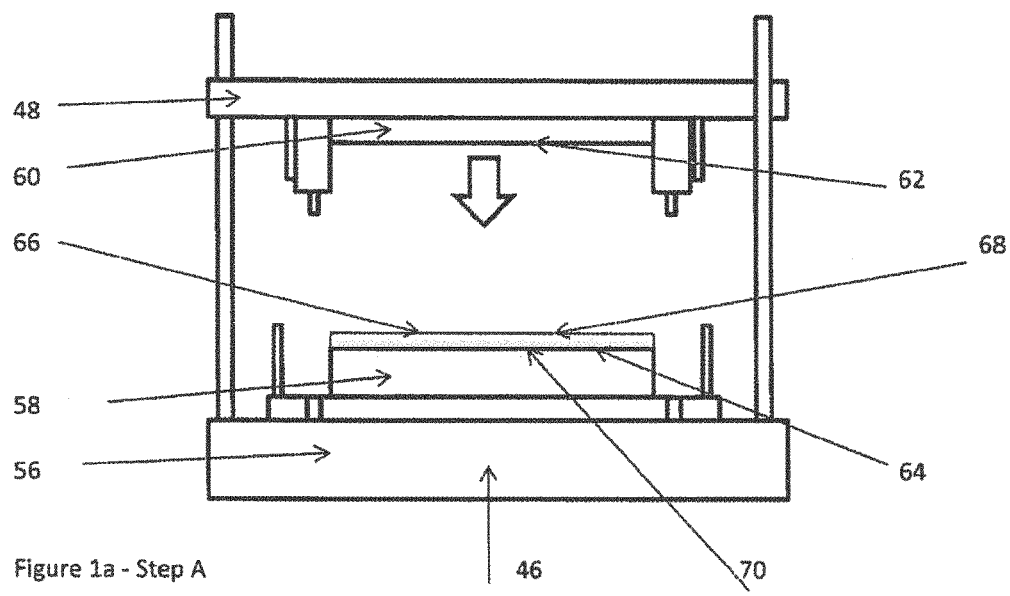
Figure 1a - Step A

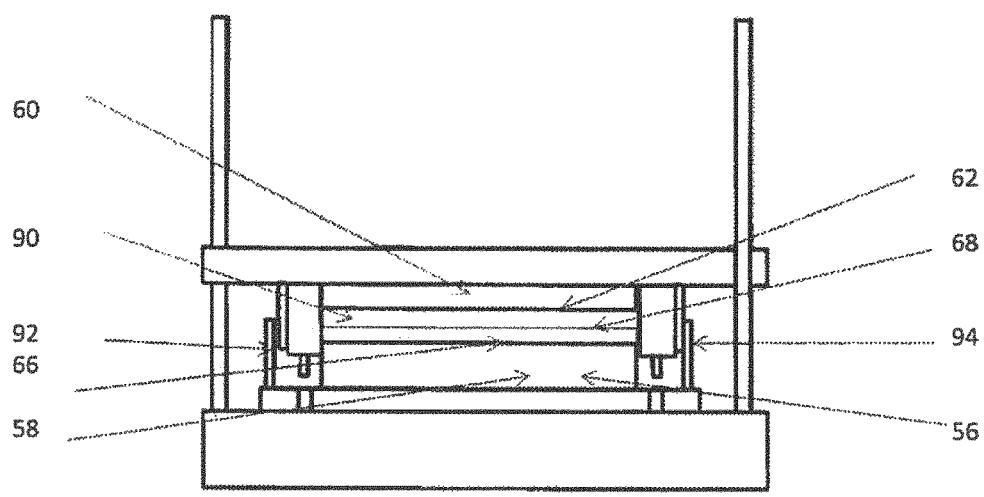
Figure 1b - Step B Phase I

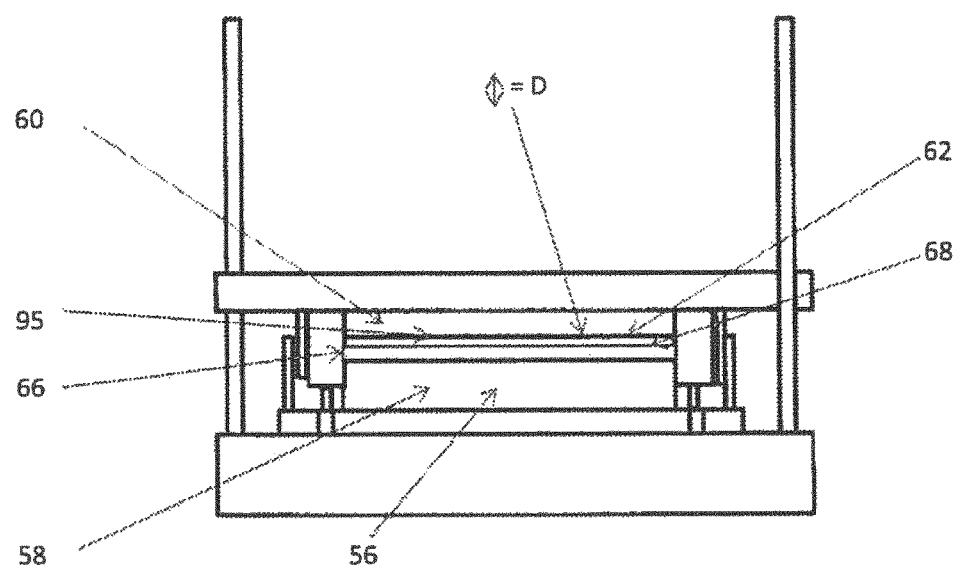
Figure 1c - Step B Phase II

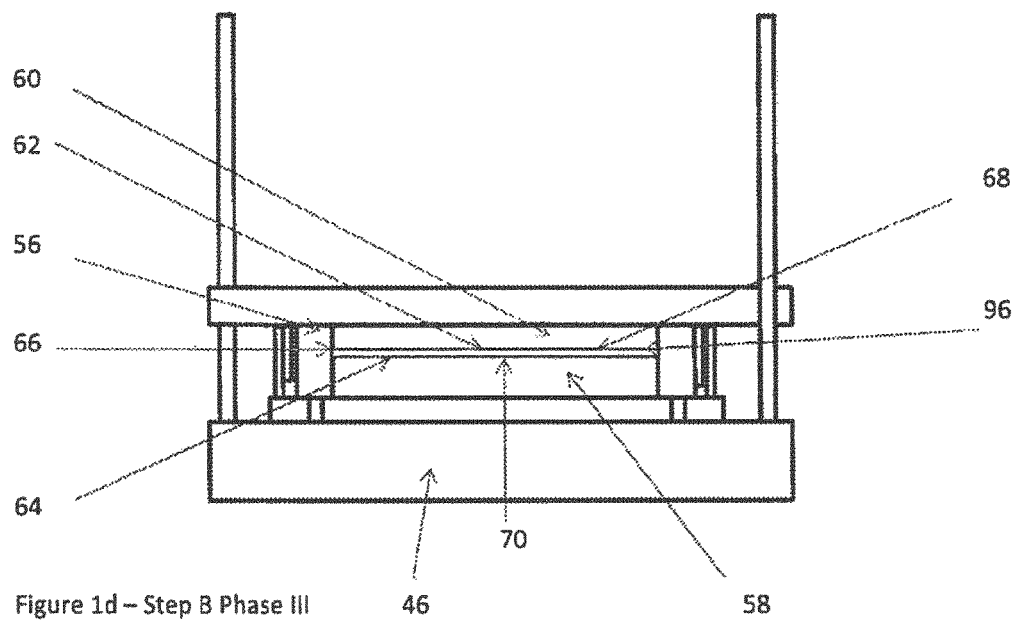
Figure 1d – Step B Phase III

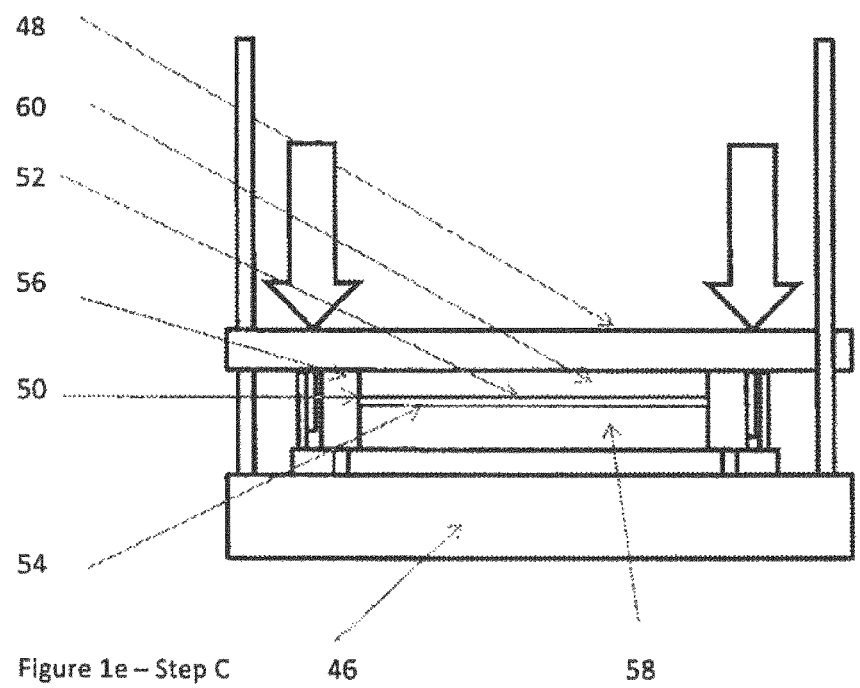

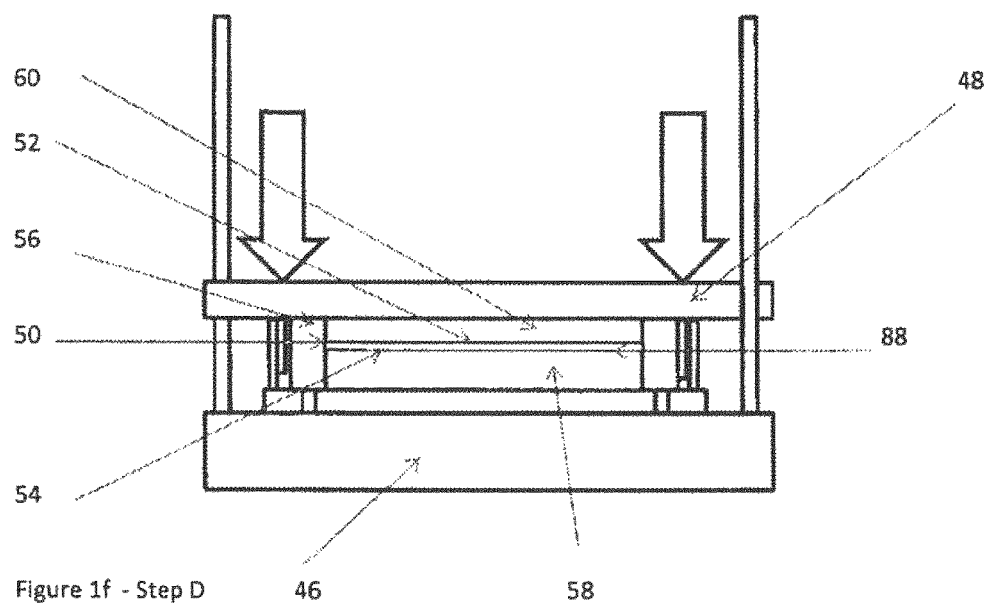
Figure 1f - Step D

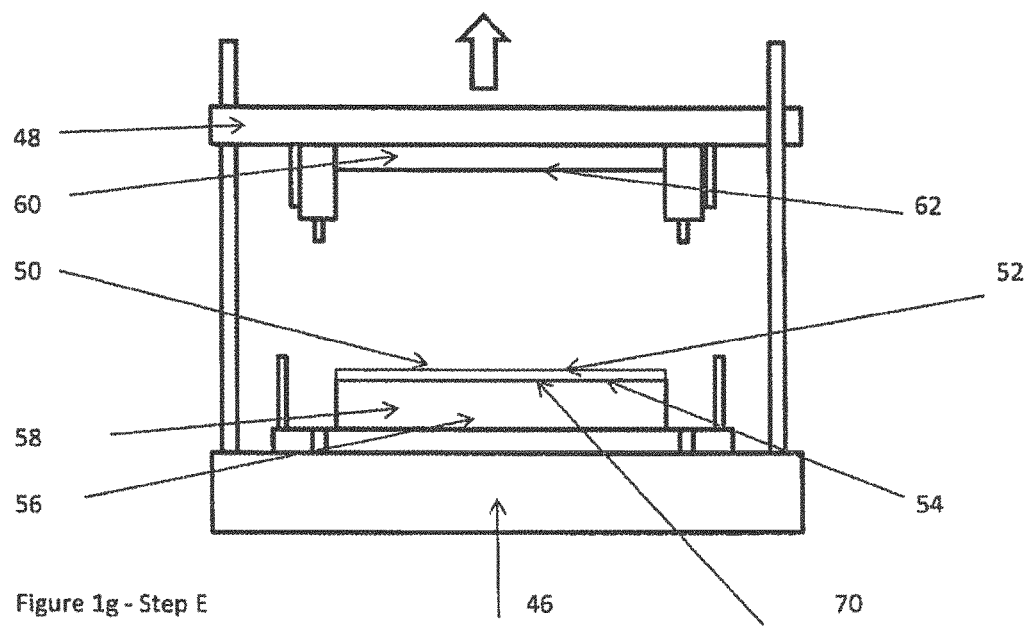
Figure 1g - Step E

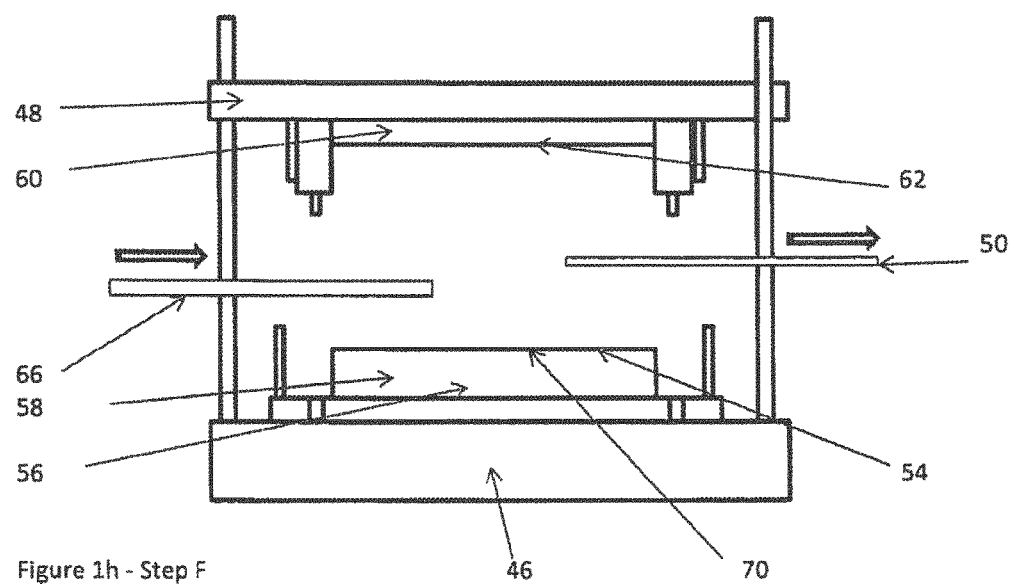
Figure 1h - Step F

PRESS MOULDING METHOD

FIELD OF THE INVENTION

The present invention relates to a method of press moulding materials including polymer resins to form a moulded part. In particular, the present invention relates to such a method which is for manufacturing moulded parts composed of fibre reinforced resin matrix composite materials, such as, for example, panels, more particularly automotive body panels.

BACKGROUND

It is known to produce moulded parts for various applications, and having various shapes and configurations, by moulding materials including polymer resins, in particular for the manufacture of moulded parts composed of fibre reinforced resin matrix composite materials. Such composite materials are typically manufactured from moulding materials which may typically comprise, for example, (a) the combination of dry fibres and liquid resin, (b) prepregs and/or (c) panel moulding compounds (SMC). Other materials may also be present, such as sandwich core materials and surfacing layers for forming a desired surface finish on the moulded part.

Many products are moulded by a manual process of laying-up the moulding material into a one sided mould, which moulds a single side of the resultant moulded article. Other products require a two-sided moulding process. In order to provide high manufacturing tolerance to the two-sided moulded part, it is sometimes required to use a press-moulding process in which the moulding material is moulded in a closed mould under elevated pressure.

The tooling is rigid, and accordingly a hydraulic pressure within the resin material of the moulding material is needed to achieve full impregnation of the fibres by the resin and cause resin flow to fill the geometrical details within the mould cavity, particularly at the peripheral edges of the mould cavity. Hydraulic pressure in the resin is generated by the press closing on the preform.

It is known to use syntactic material in prepregs. For example, the Applicant incorporates a syntactic layer, incorporating glass microspheres, into a moulding material available in commerce under the trade name Sprint CBS. The glass microspheres lower the density and increase the specific flexural modulus of the resultant moulded product. SMC material is heavy and does not yield parts with a good surface finish.

Prepreg stacks are typically made from assembling stacks of impregnated unidirectional prepreg to form a multiple angle ply laminate. This is difficult to conform to the mould geometry and high pressure is needed to press these materials.

It is accordingly an aim of this invention to provide a method of press moulding which at least partially overcome at least some of these significant disadvantages of the known press moulding materials and methods currently used to manufacture moulded parts of fibre reinforced resin matrix composite material, in particular which manufacture such parts using prepregs.

SUMMARY OF THE INVENTION

The present invention provides a method of press moulding a moulding material to form a moulded part of fibre-reinforced resin matrix composite material, the method comprising the steps of:

i. providing a mould tool having a lower mould part and an upper mould part, the upper mould part having a first moulding surface for moulding a first moulded surface of the moulded part and the lower mould part having a second moulding surface for moulding a second moulded surface of the moulded part;

ii. providing a multilaminar panel of moulding material comprising at least one layer of fibres and at least one layer of resin, the multilaminar panel having first and second opposite major surfaces;

iii. locating the moulding material in the mould tool;

iv. progressively closing the mould tool to define a substantially closed mould cavity containing the moulding material, the closing step including:

a. a preliminary closing phase to achieve mutual engagement between the lower and upper mould parts, b. a secondary closing phase after engagement between the lower and upper mould parts with the mould tool partially closed to define a closed intermediate cavity containing the moulding material, the closed intermediate cavity being larger than the moulded part and the first moulding surface of the upper mould part being spaced from the first major surface by a spacing distance, in the secondary phase air being at least partially evacuated from the closed intermediate cavity while the first moulding surface of the upper mould part is spaced from the first major surface to provide a vacuum pressure, and c. a tertiary closing phase after the vacuum pressure has been provided in the closed intermediate cavity, the tertiary phase having:

I. a first stage prior to both the first moulding surface contacting the first major surface and the second moulding surface contacting the second major surface, and II. a second compression stage after both the first moulding surface has contacted the first major surface and the second moulding surface has contacted the second major surface, the closure speed of relative movement between the lower and upper mould parts being higher in the first stage than in the second compression stage;

v. applying pressure to the moulding material in the mould cavity to configure the moulding material in a fully moulded shape; and vi. substantially fully curing the resin to form a moulded part from the moulding material.

Optionally, the at least one layer of fibres comprises at least one layer of dry fibres and the second stage causes resin impregnation of the dry fibres.

Optionally, a dry fibre layer of the multilaminar panel forms the second major surface, in the locating step iii the second major surface is disposed on the second moulding surface of the lower mould part, and the lower mould part is at an elevated temperature as compared to the temperature of the moulding material, and after the applying pressure step v resin in the multilaminar panel fully impregnates the dry fibres.

Optionally, in the secondary closing phase the air evacuation creates in the closed intermediate cavity a vacuum pressure of below 100 mbar, optionally below 50 mbar, further optionally about 10 mbar, between the lower mould part and the upper mould part.

Optionally, the closed intermediate cavity is held at the vacuum pressure for a period of from 1 second to 5 minutes, optionally from 3 seconds to 2 minutes, further optionally from 10 seconds to 60 seconds.

Optionally, for at least a part of a period that the closed intermediate cavity is at the vacuum pressure, the spacing distance is from 1 to 100 mm, optionally from 1 to 50 mm, further optionally from 2 to 50 mm, still further optionally from 10 to 40 mm.

Optionally, prior to the closing step iv the lower and upper mould parts are initially separate, and at an end of preliminary closing phase in the closing step iv the lower and upper mould parts are mutually engaged to define an initial cavity containing the moulding material.

Optionally, at the end of the preliminary closing phase a vacuum seal is engaged between the lower mould part and the upper mould part.

Optionally, the vacuum seal is engaged when the first moulding surface of the upper mould part is spaced from the first major surface by a distance of from 10 to 100 mm.

Optionally, after the initial cavity has been formed the mould tool is continuously closed to form the substantially closed mould cavity.

Optionally, after the initial cavity has been formed the mould tool is discontinuously closed, there being a dwell period at the spacing distance.

Optionally, in the second compression stage the closure speed is from 0.1 to 5 mm/second, optionally from 0.2 to 2 mm/second, further optionally from 0.3 to 1 mm/second, still further optionally about 0.5 mm/second.

Optionally, the second compression stage lasts for a period of from 0.5 to 50 seconds, optionally from 1 to 20 seconds, further optionally from 1 to 10 seconds, still further optionally about 2 seconds.

Optionally, in the second compression stage the closure speed is controlled so as to avoid excessive resin bleed out from the cavity, optionally to reduce any resin bleed out to no more than 600 grams of resin per square meter of the moulding material.

Optionally, the preliminary closing phase takes less than 20 seconds.

Optionally, before the applying pressure step v the mould is maintained in a substantially closed configuration for a dwell period of from 10 to 120 seconds, optionally from 20 to 90 seconds, further optionally from 30 to 60 seconds.

Optionally, in the applying pressure step v the pressure is applied by gradually increasing the pressure.

Optionally, in the applying pressure step v the pressure is gradually increased over a time period of from 10 to 180 seconds, optionally from 30 to 120 seconds.

Optionally, in the applying pressure step v the pressure is applied by hydraulic pressure.

Optionally, in the applying pressure step v the pressure on the first major surface is from 1 to 14 bar.

Optionally, the method further comprises the steps of: vii. separating the upper and lower mould parts; and viii. removing the moulded part from the mould tool.

Optionally, the removing step viii is carried out while the moulded part is at a temperature which is at least 5° C., optionally at least 10° C., lower than the glass transition temperature Tg of the cured resin.

Optionally, the mould tool is at a temperature which is within +/−10° C. of a target mould tool temperature throughout the moulding cycle.

Optionally, the method includes successive moulding cycles for moulding successive moulded parts and the locating step iii of a later cycle directly follows a removing step viii of an earlier cycle.

Optionally, in the locating step iii of the later cycle the mould tool is at a temperature which is within +/−10° C. of the mould tool temperature during removing step viii of the earlier cycle.

Optionally, a vacuum pressure is applied during the closing step iv and the pressure applying step v.

Optionally, the vacuum pressure is released during the curing step vi.

Optionally, the method forms a vehicle body panel of fibre-reinforced resin matrix composite material, the vehicle body panel having a front A-surface and a rear B-surface, the mould is heated and the first moulding surface moulds a front A-surface of the vehicle body panel and the second moulding surface moulds a rear B-surface of the vehicle body panel, the vehicle body panel having a front A-surface formed from the first major surface and a rear B-surface formed from the second major surface.

Optionally, the moulding material further comprises a syntactic layer comprising a polymer matrix and a plurality of hollow particles distributed within the polymer matrix.

Optionally, the syntactic layer is a core layer between first and second dry fibre layers.

Optionally, in locating step iii the moulding material drapes by bending about a neutral axis substantially centrally located with respect to the thickness of the moulding material, the neutral axis being located within the syntactic layer.

Optionally, the resin comprises a thermosetting resin, optionally an epoxy resin.

Optionally, in locating step iii the moulding material is heated to cause the viscosity of the resin initially to decrease as a result of an increase in resin temperature and then to increase as a result of initiation of curing prior to step vi.

Optionally, in locating step iii the second major surface is draped onto the second moulding surface.

Optionally, locating step iii to curing step vi are carried out at an elevated temperature above the curing temperature of the resin.

Optionally, in locating step iii a reduced pressure is applied to the mould cavity to increase the drape of the moulding material.

Optionally, in the moulding material a layer of carbon fibres is adjacent to a respective layer of resin.

Optionally, the moulding material comprises a syntactic core layer between a first carbon fibre layer and a second dry glass fibre layer defining the second major surface, each fibre layer being adjacent to a layer of resin.

Optionally, the surface resin layer is on the first major surface of the moulding material and is adjacent to the first carbon fibre layer.

Optionally, the moulding material comprises the surface resin layer, a syntactic core layer, a carbon fibre layer and a first resin layer between the surface resin layer and the syntactic core layer, a dry glass fibre layer defining the second major surface, and a second resin layer between the syntactic core layer and the dry glass fibre layer.

Optionally, the first moulding surface faces substantially downwardly and the second moulding surface faces substantially upwardly.

Optionally, the moulding material located in the mould tool in the locating step iii has a greater thickness than the moulded part and the closing step iv compresses the moulding material in the substantially closed mould cavity prior to the applying pressure step v.

In this specification, the term "substantially fully cured resin" means that the residual enthalpy of the cured resin is less than 15% of the initial heat of polymerisation, as measured by differential scanning calorimetry (DSC), of the uncured resin in the moulding material.

In some particularly preferred embodiments, the moulding material and the moulded part are panel shaped, optionally the moulded part being an automotive body panel.

In any of the embodiments, the resin preferably comprises a thermosetting resin, optionally an epoxy resin.

In any of the embodiments, in the moulding material the at least one layer of resin comprises thermosetting resin and the at least one layer of fibres comprises a woven fabric of carbon or glass fibres, optionally at least one or each woven fabric being substantially unimpregnated with any resin. In any of the embodiments, in the moulding material at least one layer of resin is adjacent to at least one layer of fibres, optionally at least one or each layer of fibres being substantially unimpregnated with any resin. In any of the embodiments, the moulding material does not comprise a sheet moulding compound (SMC).

Accordingly, the present invention provides a method which is particularly suitable for manufacturing parts composed of fibre reinforced resin matrix composite materials, such as, for example, panels, more particularly automotive body panels which are fully impregnated and require no or limited subsequent trimming, machining or rework operations.

The present invention is at least partially predicated on the surprising finding by the present inventors that the press moulding process can be controlled to provide a high quality surface finish from a surface resin layer, reducing fibre print-through at the surface.

In addition, it has been found that by controlling the resin pressure during impregnation, high impregnation can be achieved without excessive resin bleed out from the mould. For example, in some preferred embodiments excessive resin bleed out from the mould may be quantified as more than 600 grams of resin per square meter of the moulding material.

In addition, it has been found that by controlling the upper mould temperature and spacing from the moulding material during a particular closing phase, not only can this increase the surface quality but also high tool temperatures can be employed, which reduces the cycle time.

In addition, it has been found that by providing a dry fibre lowermost layer in the moulding material, this enables the moulding material to be slid into place in the mould, and for the dry fibre layer thermally to insulate the resin layers against premature heating, enhancing surface quality and impregnation.

The preferred embodiments of the invention can improve the surface properties of the moulded part, particularly at the "A-surface" where the surfacing layer is provided as the front face of the moulding material and the moulded part.

The press moulding method of the invention may be employed for the press moulding of prepreg, multi-laminar, preform and random fibre moulding materials, and may be used in a variety of applications, including but not limited to the press moulding of automotive body parts.

The press moulding method of the invention may be employed to produce high volume, lightweight, low cost automotive body panels composed of composite material, and such production may incur minimal labour costs as a result of reducing or avoiding post-moulding finishing costs.

The resin composition may be selected to have a high degree of cross-linking, so as to have a high glass transition temperature Tg, with the result that the moulded part is able to be conveyed along a high temperature paint line without distortion or surface damage to maintain what is categorised for automotive body panels by those skilled in the art as a "class A" surface finish.

BRIEF DESCRIPTION OF THE DRAWINGS

Embodiments of the present invention will now be described by way of example only, with reference to the accompanying drawings, in which:

FIGS. 1a to 1h collectively comprise a process flow diagram schematically illustrating respective sequential steps in a press moulding method in accordance with an embodiment of the present invention.

DETAILED DESCRIPTION

Figure 2:
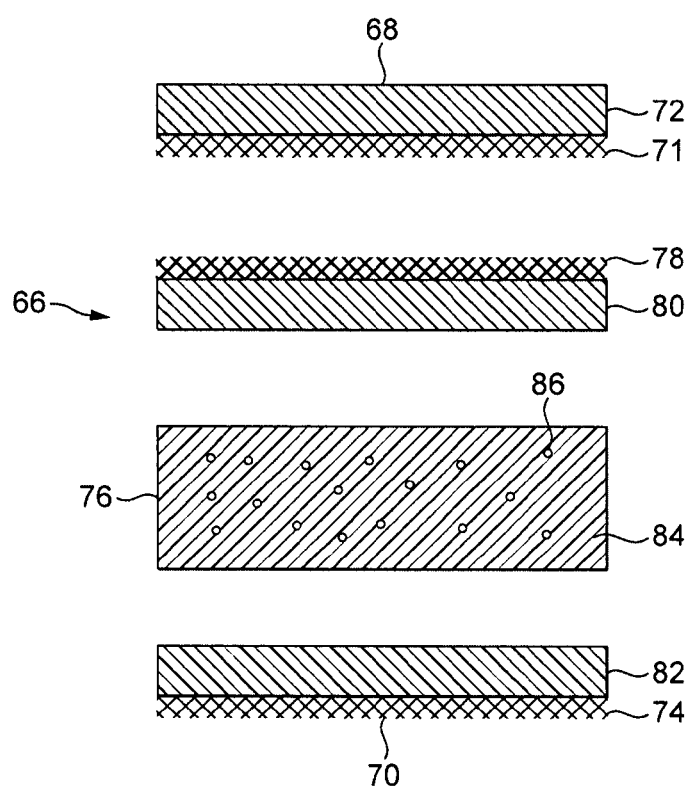
FIG. 2 illustrates an exploded view of a cross section through a moulding material for use in a press moulding method in accordance with an embodiment of the present invention.

In each of the Figures, some dimensions, in particular of the moulding material and its component layers, are not illustrated to scale, but are enlarged for the purpose of clarity of illustration.

Referring to FIGS. 1a to 1h, there is shown a schematic flow diagram of a method of press moulding a moulding material to form a moulded part 50, as shown in FIG. 1h, of fibre-reinforced resin matrix composite material in accordance with a preferred embodiment of the present invention.

In the preferred embodiment, the method forms a vehicle body panel 50 of fibre-reinforced resin matrix composite material. The vehicle body panel 50 has a front A-surface 52 and a rear B-surface 54.

In the method, a mould tool 56 is provided having a lower mould part 58 and an upper mould part 60. The mould tool 56 comprises part of an apparatus 46 for press moulding materials to form a moulded part of fibre-reinforced resin matrix composite material. The apparatus 46 further comprises a press 48, typically hydraulically actuated, which urges together the upper and lower mould parts 60, 58 which, when the mould tool 56 is finally closed and pressurised, defines a mould cavity 88 of predetermined volume, shape and dimensions so that the moulded part 50 contained therein also has a predetermined volume, shape and dimensions. In the illustrated embodiment the lower mould part 58 is stationary and the upper mould part 60 is moved vertically by the press 48.

The upper mould part 60 has a first moulding surface 62 for moulding a first moulded surface of the moulded part, such as the front A-surface 52 of the vehicle body panel 50 and a second moulding surface 64 for moulding a second moulded surface of the moulded part, such as the rear B-surface 54 of the vehicle body panel 50. The first moulding surface 62 faces substantially downwardly and the second moulding surface 64 faces substantially upwardly.

A multilaminar panel of moulding material 66, as shown in FIG. 1a, is provided to be moulded by the mould tool 56 into the moulded part 50.

Referring to FIG. 2, there is shown a cross section through part of a moulding material 66 for use in a press moulding method in accordance with a first embodiment of the present invention. An exploded view is shown, which also shows what materials are typically combined together to form the moulding material 66 with the various layers, for example each fibre layer being pre-assembled together with a respective resin layer. The moulding material 66 is for press moulding to form a moulded part of fibre-reinforced resin matrix composite material. The moulding material 66 is panel shaped, optionally being adapted to form an automotive body panel by press moulding at elevated temperature and pressure.

As discussed above, the moulding material 66 comprises at least one layer of fibres and at least one layer of resin. The multilaminar panel 66 has first and second opposite major surfaces 68, 70. A surface resin layer 72 of the multilaminar panel 66 is at or adjacent to the first major surface 68 and a dry fibre layer 74 of the multilaminar panel 66 forms the second major surface 70. Typically, in the moulding material the at least one layer of resin comprises thermosetting resin and the at least one layer of fibres comprises a woven fabric of carbon or glass fibres. Typically, in the moulding material at least one layer of resin is adjacent to at least one layer of dry fibres. Typically, the moulding material does not comprise a sheet moulding compound (SMC).

In the preferred embodiment, the front A-surface 52 of the vehicle body panel 50 is formed from the first major surface 68 and the rear B-surface 54 is formed from the second major surface 70.

In the preferred embodiment, as shown in FIG. 2, the moulding material 66 comprises the surface resin layer 72, a syntactic core layer 76, a carbon fibre layer 78 and a first resin layer 80 between the surface resin layer 72 and the syntactic core layer 76. The surface resin layer 72 defines the first major surface 68. The surface resin layer 72 is typically carried on a fibre layer 71, such as a glass fibre layer. A dry glass fibre layer 74 defines the second major surface 70, and a second resin layer 82 is between the syntactic core layer 76 and the dry glass fibre layer 74. If desired, optional additional carbon or glass fibre layers and associated resin layers may be disposed between the surface resin layer 72 and the syntactic core layer 76. If desired, additional carbon or glass fibre layers and associated resin layers may be disposed between the dry glass fibre layer 74 and the syntactic core layer 76. Such additional layers may be provided to provide locally or generally increased thickness and strength to the moulded part.

The syntactic layer 76 comprises a polymer matrix 84 and a plurality of hollow particles 86 distributed within the polymer matrix 84. The resin layers 72, 80, 82 typically comprise a thermosetting resin, preferably an epoxy resin.

The multilayer laminate moulding material 66 is an engineered structure which is configured to achieve low weight and to avoid thermal warping as cools down from the moulding temperature.

The or each layer 78 of carbon fibres is adjacent to a respective layer 80 of resin, and each layer of glass fibres 74 is adjacent to a respective layer 82 of resin.

Typically, the surface resin layer 72 is on the first major surface 68 of the moulding material 66.

The central syntactic lightweight core layer 76 includes a polymer matrix layer, typically composed of the same curable resin as used to impregnate the fibre layers, for example a thermosetting resin such as epoxy resin, and hollow particles substantially homogeneously distributed therein.

Typically, the syntactic layer 76 has a density of from 400 to 1000 kg/m$^3$. The syntactic layer 76 may typically have a volume which is from 30 to 85% of the volume of the curable resin in the moulding material 66.

The hollow particles are substantially incompressible at the compressive moulding pressure applied to the moulding material of from 0.1 to 2 MPa optionally from 0.1 to 1 MPa. Typically, the hollow particles comprise substantially rigid microspheres having a crush strength of greater than 10 MPa, optionally being composed of glass. The hollow particles may have an average (d=0.5) diameter of from 5 to 120 microns, and may be spherical. The hollow particles may have a shape other than spherical.

The syntactic material employs non-compressible, e.g. glass, microspheres with a crush strength in excess of the moulding pressure, for example a crush strength >30 bar. This structure provides a strong but light core. The low density syntactic material enables a significant reduction of the panel weight. The rigid incompressible microspheres add strength, rigidity and lightness to the cured product. They may be only slightly compressible during moulding due to the elastic reduction of the microsphere under load. At a critical pressure however the microsphere buckles and fails due to the low strain of the glass. It is possible to then select different grades to have a compressible material but the crush strength is generally well in excess of the desired moulding pressure.

Optionally, the syntactic material may also comprise compressible or expandable polymer microspheres which may be compressed during the pressure moulding to compensate for the variable volume of prepreg in the tool due to manufacturing tolerances.

In some areas of the multilayer laminate 66, the syntactic core layer 76 may be omitted. For example, when the moulding material is to form an automotive body panel, the syntactic core layer 76 is omitted in low thickness regions, such as edges of the body panel or fine details where the moulding material comprises surface film and fibre laminate only. In addition, in some areas of the multilayer laminate 66 optional additional reinforcements may be provided for localised strength.

In this embodiment a carbon fibre layer 78 is intended to be located toward the exposed surface of the part to be moulded from the moulding material, for example the surface of an automotive body panel. This carbon fibre layer 78 is a structural layer to provide stiffness to the moulded part, such as a panel. Typically, carbon fibre layer 78 comprises carbon fibres, typically woven into a fabric, although in other embodiments glass fibres, typically woven into a fabric, may alternatively be employed.

The carbon fibre layer 78 is selected to provide the desired mechanical properties to the resultant moulded part. For example, when the moulded part is intended to be an automotive body panel, the fibre layer 78 has a low coefficient of thermal expansion and high tensile modulus.

The resin in the moulding material is typically a curable thermosetting resin, such as an epoxy resin, and is preferably selected to have a composition to provide, when cured, a high glass transition temperature Tg, for example a Tg of at least 200° C. This high temperature is selected so that the cured moulded part can be subjected to elevated temperatures, for example by passing a press moulded automotive body panel down a high temperature automotive body paint line, without degradation or warping of the panel.

A thermosetting resin, such as an epoxy resin, which is thermally stable at 200° C. has a high cross link density, and correspondingly tends to exhibit a highly exothermic cure. Accordingly, the structure of the panel is adapted to resist degradation or warping of the part during the exothermic cure.

The surface resin layer 72 typically comprises a thermosetting resin, such as an epoxy resin, which is thermally stable at 200° C. The surface resin layer 72 functions to permit the resultant cured and moulded surface to accept a later-applied paint primer and to buffer against deformation (known in the art as "print-through") of the moulded surface by the uppermost fibre layers. Such print-through may be generated by uppermost layers of high modulus and/or high fibre thickness, and is particularly prevalent when carbon fibres are employed at the surface of the moulded part. The thermosetting resin may include a filler such as talc. The talc filler provides the cured surface layer with an abradability so that the surface can be easily abraded, in order to provide a desired finish to the surface or to repair the surface. The talc filler also reduces the coefficient of thermal expansion of the surface resin layer 72 and increases the tensile modulus of the surface resin layer 72.

Such a fibre/resin structure provides panel stiffness and assists, together with the remaining layers as discussed below, in achieving a balance of the thermal expansion of the various layers on opposite sides of the core layer 76, so that the entire multilayer structure tends not to warp during manufacture or use. The carbon fibre exhibits a low coefficient of thermal expansion and a high tensile modulus, such as Young's modulus. However, for the combination of the surface resin layer 72, carbon fibre layer 78 and the resin layer 80 the combined thermal expansion may be relatively high due to the thickness of the surface resin layer 72.

One or more further fibre layers, together with any necessary associated resin, either as prepreg or resin layers, may optionally be located remote from the exposed surface of the moulding material. This may provide one or more further structural layers to provide stiffness to the moulded part, such as a panel. Typically, the further fibre layer or layers may comprise carbon or glass fibres, woven into a fabric.

The fibre layers together with the resin layers and the surface resin layer provide good thermal balance to the entire laminate of moulding material 66 during the press moulding process.

During cure, the relative layer positions need to be maintained to retain the mechanical properties of the engineered structure and avoid warping. The outer carbon fibre layer 78 has a lower coefficient of thermal expansion than the inner glass fibre layer 74, but the combination of the different layer structures on opposite sides of the syntactic core layer 76 tends to balance the thermal expansion coefficient on either side of the syntactic core layer 76 leading to reduced distortion when moulding the moulding material 66 at elevated temperature and pressure. The layer properties, in particular the coefficient of thermal expansion, are selected to provide a neutral axis within syntactic core layer 76 which avoids thermal distortion during press moulding at elevated temperature.

When the mould tool 56 is in the open configuration, as shown in Step A of FIG. 1a, the moulding material 66 is located in the mould tool 56 by disposing the second major surface 70 on the second moulding surface 64 of the lower mould part 58.

The mould tool 56 is heated. The lower mould part 58 is at an elevated temperature as compared to the temperature of the moulding material 66 during Step A. In addition, the upper mould part 60 is at an elevated temperature as compared to the temperature of the moulding material 66 during Step A. Preferably, the method of the invention includes successive moulding cycles for moulding successive moulded parts 50, and the locating step of a later cycle directly follows a step of removing a moulded part 50 moulded in an earlier moulding cycle.

Since the moulding cycle uses a heated mould tool 56, and the curing of the resin tends to be exothermic, the mould tool 56 is still heated when the moulding material 66 is located in the mould tool 56 in Step A. The mould tool 56 is not cooled by any cooling system, although heat from the mould tool 56 is lost to the atmosphere and to the moulded part 50. The use of a substantially constant mould tool temperature, in particular within +/−10° C. of a target temperature, thereby avoiding heating and cooling phases, greatly increases the speed and productivity of the moulding method using the mould tool 56. Typically, in the locating Step A of the later moulding cycle the mould tool is at a temperature which is within +/−10° C. of the mould tool temperature during the moulded part removing step of the earlier moulding cycle.

The dry glass fibre layer 74 defining the second major surface 70 is disposed against the second moulding surface 64 of the lower mould part 58. The dry fibre layer 74 permits the moulding material 66 readily to be slid into the exact moulding position on the second moulding surface 64 without any inadvertent bonding of the moulding material 66 to the heated second moulding surface 64. The absence of any resin in the second major surface 70, since any resin present in the moulding material 66 is only remote from the second major surface 70, avoids premature melting of the resin against the second moulding surface 64, even if the temperature of the second moulding surface 64 is higher than the resin melting temperature.

In FIGS. 1a to 1e the moulding surfaces of the mould tool 56 and the correspondingly moulded surfaces 52, 54 of the moulded part 50 are shown as being planar for clarity of illustration. However, in nearly every embodiment of the present invention the moulding and moulded surfaces have a three dimensional shape and configuration, for example as present in a vehicle body panel.

In the locating Step A, the moulding material 66 drapes onto the three dimensional shape and configuration of the second moulding surface 64 by bending about a neutral axis substantially centrally located with respect to the thickness of the moulding material 66, the neutral axis being located within the syntactic layer 76. The moulding material 66 is heated by the mould tool 56 during the locating Step A to cause the viscosity of the resin initially to decrease as a result of an increase in resin temperature and then to increase as a result of initiation of curing.

Typically, from the locating Step A to the later resin curing step, as discussed below, the various steps of the method are carried out at an elevated temperature, which is preferably above the curing temperature of the resin. The resin curing step, at least, is carried out above the curing temperature of the resin.

Optionally, in locating Step A a reduced pressure is applied to the mould cavity to increase the drape of the moulding material 66. The drape occurs under the action of gravity.

However, the presence of a negative pressure beneath the moulding material 66, for example caused by vacuum pressure provided by ducts (not shown) in the second moulding surface 64, enhances the drape caused by the action of gravity.

The draping at least partly under the action of gravity within the mould configures at least part of the draped moulding material 66 in a partly moulded shape. The moulding material 66 typically drapes by bending about a neutral axis substantially centrally located with respect to the thickness of the moulding material 66. The neutral axis is optionally located within the syntactic layer 76.

A lower surface 70 of the moulding material is draped onto at least a part of a second moulding surface 64 of the mould tool 56. This pre-shaping of the moulding material 66 by draping achieves preliminary pre-shaping without moulding stresses being introduced into the moulding material 66.

After the locating Step A, there is a closing Step B having three phases I, II and III. Prior to the closing Step B, and also in the locating Step A, the lower and upper mould parts 58, 60 are initially separate. In the closing Step B, the mould tool 56 is closed to define a substantially closed mould cavity 96 containing the moulding material 66.

The closing step B comprises progressively closing the mould tool 56 to define a substantially closed mould cavity 96 containing the moulding material 66. In the preferred embodiments, the moulding material 66 located in the mould tool 56 in the locating Step A has a greater thickness than the moulded part 50 and the closing Step B compresses the moulding material 66 in the substantially closed mould cavity 96 prior to a subsequent applying pressure Step C.

Referring to FIG. 1b, the closing Step B includes a preliminary closing Phase I to achieve mutual engagement between the lower and upper mould parts 58, 60. At the end of the preliminary closing Phase I the lower and upper mould parts 58, 60 are mutually engaged to define an initial cavity 90 containing the moulding material 66. The preliminary closing Phase I typically takes less than 20 seconds. A relatively rapid Phase I is desirable to minimise cycle time.

At the end of the preliminary closing Phase I, a vacuum seal 92, 94 is engaged between the lower mould part 58 and the upper mould part 60. Typically, the vacuum seal 92, 94 is engaged when the first moulding surface 62 of the upper mould part 60 is spaced from the first major surface 68 by a distance of from 10 to 100 mm.

Referring to FIG. 1c, the closing Step B also includes a secondary closing Phase II after engagement between the lower and upper mould parts 58, 60 and engagement of the vacuum seal 92, 94.

During Phase II the mould tool 56 is closed further to achieve a partially closed configuration which defines a closed intermediate cavity 95 containing the moulding material 66. The closed intermediate cavity 95 is larger than the moulded part 50 and the first moulding surface 62 of the upper mould part 60 is spaced from the first major surface 68 by a spacing distance D. The upper mould part 60 is at an elevated temperature as compared to the temperature of the moulding material 66. By providing the spacing distance D, premature flow, melting and curing of the surface resin layer 74 is prevented or reduced, as described further in detail below.

In the secondary closing Phase II, air is at least partially evacuated from the closed intermediate cavity 95 while the first moulding surface 62 of the upper mould part 60 is spaced from the first major surface 68 to provide a vacuum pressure, typically a preset vacuum pressure, for example a vacuum pressure below a desired maximum pressure threshold. Typically, the evacuation step creates in the closed intermediate cavity 95 a preset vacuum pressure of at least below 100 mbar absolute, optionally at least below 50 mbar absolute, further optionally below about 10 mbar absolute, between the lower mould part 58 and the upper mould part 60.

Typically, the closed intermediate cavity 95 is held at the preset vacuum pressure for a period of from 1 second to 5 minutes, optionally from 3 seconds to 2 minutes, further optionally from 30 seconds to 60 seconds. Typically, for at least a part of a period that the closed intermediate cavity is at the preset vacuum pressure, the spacing distance D is from 1 to 100 mm, optionally from 1 to 50 mm, further optionally from 2 to 50 mm, still further optionally from 10 to 40 mm.

Thereafter, as shown in FIG. 1d, the closing Step B includes a tertiary closing Phase III after the preset vacuum pressure has been provided in the closed intermediate cavity 95. The tertiary Phase III forms a substantially closed mould cavity 96.

The tertiary Phase III includes a first stage prior to the first moulding surface 62 contacting the first major surface 68, in this embodiment the second moulding surface 64 already contacting the second major surface 70. FIG. 1d illustrates the configuration at the end of the first stage.

The tertiary Phase III includes a subsequent second compression stage after both the first moulding surface 62 has contacted the first major surface 68 and the second moulding surface 64 has contacted the second major surface 70. The closure speed of relative movement between the lower and upper mould parts 58, 60 is higher in the first stage than in the second compression stage.

In the second compression stage, the compression of the moulding material 66 causes progressive resin impregnation of the dry fibres without increasing the resin pressure to a minimum threshold value to cause resin bleed out from the cavity. In particular, the closure speed is controlled so as to cause impregnation of the dry fibre layer by the resin without bleeding out resin from the cavity. Typically, the closure speed is from 0.1 to 5 mm/second, optionally from 0.2 to 2 mm/second, further optionally from 0.3 to 1 mm/second, still further optionally about 0.5 mm/second. Typically, the second compression stage lasts for a period of from 0.5 to 50 seconds, optionally from 1 to 20 seconds, further optionally from 1 to 10 seconds, still further optionally from 2 to 20 seconds, such as about 2 seconds.

In one embodiment, after the initial cavity 90 has been formed in the preliminary closing Phase I the mould tool 56 is continuously closed to form the substantially closed mould cavity 96. In an alternative embodiment, after the initial cavity 90 has been formed in the preliminary closing Phase I the mould tool 56 is discontinuously closed, there being a dwell period at the spacing distance D.

In this specification, the term "substantially closed mould cavity" means that the upper mould part 60 has made contact with the upper surface of the moulding material 66 on the lower mould part 58 and the moulding material 66 is within and substantially fills the mould cavity 96. The closing step applies the downward weight of the upper tool part 60, and vacuum pressure if applied, which may at least partially compact the moulding material 66 and at least partially impregnate dry fibres in the moulding material 66 with resin. The downward weight of the upper tool part 60, and vacuum pressure if applied, is reacted by the moulding material 66 to generate hydraulic pressure in the resin, which may cause resin impregnation of the fibres. Some additional pressing force on the mould tool may be applied during the closing step to achieve the substantially closed mould cavity.

Thereafter, as illustrated in FIG. 1e, a pressure applying step C is carried out. This step applies additional pressing force, as represented in FIG. 1e by two downwardly directed arrows, on the mould tool 56 which may further close the substantially closed mould cavity 96 so as to achieve a final closed mould cavity 88. This applied load may further compact and impregnate the moulding material 66 to achieve final compaction and impregnation. A load is applied by the press 48 to the moulding material 66 in the mould cavity 96 to configure the moulding material 66 in a fully moulded shape in the final closed mould cavity 88. This load acts on the moulding material 66 and a hydraulic pressure is generated within the moulding material 66 which approximates to the applied press load divided by the component cross sectional area, ignoring frictional effects. Typically, before pressure applying step C, the mould tool 56 is maintained in a substantially closed configuration for a dwell period of from 10 to 120 seconds, optionally from 20 to 90 seconds, further optionally from 30 to 60 seconds where the weight of the tool and vacuum force compacts the preform causing a period of gradual impregnation.

In the pressure applying step C, the load is preferably applied by gradually increasing the load, and typically the load is gradually increased over a time period of from 10 to 180 seconds, optionally from 30 to 120 seconds. A parameter independent on the size of the area of different moulded parts, the applied pressure is the applied load divided by the surface area of the A-Surface of the moulded part. Typically, the applied pressure on the on the first major surface is from 1 to 14 bar.

After the pressure applying step C, resin in the multilaminar panel moulding material 66 fully impregnates the dry fibres and the mould tool 56 closes to its final cavity 88 position.

In the preferred embodiments, a vacuum pressure is applied not only during the closing Step B but also in the pressure applying Step C.

Although some preliminary resin curing may occur from the locating Step A, through the closing Step B and in the pressure applying Step C, since the moulding material 66 is in contact with the heated mould tool 56, after the pressure applying Step C there is a curing Step D, as shown in FIG. 1*f,* carried out under the applied pressure, during which the resin is substantially fully cured to form the final moulded part 50 from the moulding material 66.

Typically, the vacuum pressure is released during the curing Step D. The curing or cured resin no longer flows and the fibres are fully impregnated, and so the vacuum pressure is no longer required to enhance the quality of the moulded part 50. Also, releasing the vacuum during curing reduces the risk of any resin flash inadvertently penetrating between the lower and upper mould parts 58, 60 from being drawn into the pipework of the vacuum system.

After the formation of the final moulded part 50, as shown in FIG. 1*g*, there is a Step E of separating the upper and lower mould parts 58, 60 and, as shown in FIG. 1*h*, a Step F of removing the moulded part 50 from the mould tool 56. In FIG. 1*h* a further moulding material 66 for moulding in a subsequent mould cycle is shown being located in the mould tool 56.

The removing Step F is typically carried out while the moulded part 50 is at a temperature which is at least 5° C., more typically at least 10° C., lower than the glass transition temperature Tg of the cured resin. The temperature of the moulded part 50 substantially corresponds to the temperature of the first and second moulding surfaces 62, 64 during the separating Step E. This temperature differential between the Tg and the temperature of both the moulded part 50 and the mould tool 56 enables the moulded part 50 to be demoulded at an elevated temperature without distorting, thereby avoiding the need to cool the mould tool 56, and consequently the moulded part 50, before demoulding.

The avoidance of mould tool cooling increases productivity by recuing the cycle time for successive moulding cycles reduces energy consumption and reduces both capital equipment and production costs.

In the illustrated embodiment, the dry fibre layer 74 acts as to provide thermal insulation between the heated second moulding surface 64 of the lower mould part 58 and any resin in the moulding material 66. This prevents or reduces premature gelling of the resin during the locating Step A and the closure Step.

Also, the dry fibre layer 74 enhances air removal from the moulding material 66 and mould cavity at the second moulding surface 64 during the application of a vacuum to the mould cavity in the closing, pressure applying and curing Steps B, D and D. In contrast, if any resin contacted that second moulding surface 64 the resin would melt and cure very rapidly, and would then cause air to be trapped in air pockets surrounded by resin at the second moulding surface 64. Such air pockets are difficult to eliminate by application of vacuum pressure and the later additional applied pressing pressure. The use of a dry fibre surface in contact with the lower mould part 58 avoids air pocket formation.

In addition, the dry fibre layer 74 permits easy sliding of the moulding material 66 over the second moulding surface 64. Not only does this sliding enable the moulding material to be accurately slid into the correct position without entrapping air at the interface with the second moulding surface 64, but also the easy siding enhances the ability of the moulding material 66 to drape, while avoiding bridging over mould details, and reduces the likelihood of the moulding material 66 being incorrectly positioned, which could prevent effective closure of the mould tool 56.

The dry fibre layer 74, resin, other moulding material features and moulding method parameters are typically controlled so that the resin only contacts the second moulding surface 64 during the pressure applying step C, which achieves full impregnation of the dry fibres in the moulding material 66.

In contrast, resin contacting the hot mould surface 64 can quickly thicken and gel, especially in a layer close to the tool surface while the moulding material is first located into the mould and while the mould is closing. If, instead of the dry fibre layer 74, an impregnated or partially impregnated prepreg is used, then the resin can cause the prepreg to adhere to the tool surface. Fibres can be pinned, or bridged, across tool geometry changes by the now partially cured resin matrix, which can prevent the tool closing to its desired cavity or cause unwanted fibre and resin fracture as the tool closes. To use such a moulding material, the second moulding surface 64 would typically need to be cooled and re-heated to prevent unwanted cure onset and fibre bridging, which in turn would tend to add time and cost to the moulding method.

In contrast, by providing the surface resin layer 72 at or adjacent to the first major surface 68, in the final moulded part 50 the corresponding first moulded surface has enhanced surface quality and smoothness because the resin can be uniformly distributed across the entire front surface area of the moulded part 50. The risk of air trapping in this surface resin is essentially eliminated by the earlier vacuum step. The surface resin layer 72 is quickly melted and cured when the surface resin layer 72 finally comes into contact with the heated first moulding surface 62 in the second compression stage of the tertiary Phase III when the first moulding surface 62 has contacted the first major surface 68.

By providing the surface resin layer 72 and the associated method parameters the first moulded surface of the moulded part can have very high surface quality and be employed as the front A-surface of a vehicle body panel. The dry fibre layer may, in some embodiments, result in the second moulded surface of the moulded part to have a lower surface quality than the first moulded surface, and the second moulded surface may be readily employed as the rear B-surface 54 of the vehicle body panel 50.

In the closure Step B, the use of air evacuation while the heated first moulding surface 62 is spaced by the spacing distance D from the first major surface 68 of the moulding material 66 prevents the risk of any air being inadvertently trapped at the upper surface of the moulding material 66 which would otherwise generate surface defects. As the upper mould part 60 is lowered, under a preset vacuum pressure within the mould cavity, to come into contact with the moulding material 66, the surface resin layer 72 contacts the heated upper mould part 60. Consequently, the surface resin layer 72 softens, melts, and begins to cure, very rapidly at the immediate surface and slower with a heat lag deeper into the bulk of the thickness of the surface resin layer 72. The cure onset of the surface resin layer 72 in contact with the heated upper mould part 60 generates a beneficial resin-rich layer at the front A-surface, which in turn produces highly desirable, high cosmetic surface quality carbon fibre panels with visible carbon fibres but a protective resin finish which reduces later read-through, or print-through, of the underlying carbon fibres.

This resin layer can then produce an aesthetic effect where the carbon weave has an attractive visible appearance but the outer surface remains smooth during its in service life. Without this resin layer the surface can take on the woven texture and the quality can be reduced. In such a carbon fibre panel, the surface resin layer would typically be from 50 to 200 microns thick.

When the panels are to be painted a thicker surface resin layer 72 would be used to prevent any of the underlying fibre pattern printing through to the final paint finish. Typically the resin layer would be 200 to 800 microns thick.

The provision of the spacing distance D between the heated first moulding surface 62 and the first major surface 68 of the moulding material 66 prevents premature softening or flow of the surface resin layer 72. This avoids the resin layer 72 taking up the fibre pattern of the underlying fibre layer, such as a carbon fibre layer, and then starting to cure, which in turn reduces the ability of the resin to flow and wet the surface properly, leaving fibre read-through or print-through and surface pit defects.

The surface resin layer 72 can be thicker than typical surface resin layers in known prepreg constructions, because of the curing control discussed above. Furthermore, in the prior art it was known to use an additional surface layer, such as a polyester scrim layer, to provide air transport properties at the surface with the aim of reducing surface defects resulting from trapped air. The present invention can permit such additional surface layers to be eliminated. A uniform surface finish is achieved directly out of the mould by a surface resin layer, and the surface finish quality is typically improved as compared to moulded part made using a manually laid-up vacuum bag process well known to those skilled in the art.

During the second compression stage of the Tertiary Phase III of the closing Step B, the moulding material 66 is compressed and resin can flow and impregnate the fibre layers, in particular any fibre layer below and adjacent to the respective resin layer. The volume of the initial moulding material 66 is greater than the volume of the final moulded part 50. The dry fibres introduce loft into the moulding material 66, and the lift is removed when the dry fibre is fully impregnated by the resin. During the mould closure, the compression generates a pressure differential in the moulding material, forcing resin to flow into spaces around fibres and between fibre tows. As the impregnation proceeds, the resin pressure gradually reduces.

However, if the compression force is too high and causes a moulding material volume reduction rate which is too fast, the resin cannot flow sufficiently quickly and therefore the resin exerts a back pressure. If the resin back pressure is too high, the resin may inadvertently be forced to release pressure by flowing out through the mould edges, and break past any resin seals, thereby generating undesired resin flash. Such resin flash bleed out can result in there being insufficient resin remaining within the cavity to achieve a good quality, fully impregnated, low void content composite material laminate.

The preferred embodiments of the method of the invention avoid excess back pressure and the problem of resin bleed out by careful control of the mould closure speed. The mould closure speed is reduced to provide a balance between generating sufficient resin pressure to ensure complete and uniform impregnation, which is achieved progressively in a controlled manner, and keeping below a maximum resin pressure threshold so as to avoid resin from bleeding out of the mould.

After the mould tool has been substantially closed, the press load is ramped up gradually to increase the hydraulic pressure within the moulding material so as to avoid excessive resin bleed out. As the viscosity of the progressively curing resin starts to rise and the moulding material approaches full impregnation, a higher hydraulic pressure can be applied to enhance the achievement of complete impregnation and provide high quality defect-free surfaces. The more viscous resin is less likely to flow out of the mould cavity, permitting a higher hydraulic pressure in the mould cavity. The use of such a pressure ramping cycle provides an overall lower pressure and more even pressure in the preferred moulding method, which reduces the capital and running costs of the hydraulic press.

The moulding method of the invention may be used with other moulding materials and multilaminar configurations apart from those of FIG. 2.

The preferred embodiments of the present invention can provide the press moulding of a compressible multilayer moulding material which can deliver consistent press moulded composite parts. This moulding material can enable net shape parts to be manufactured, thereby requiring less finishing work and permitting the use of simpler press and tooling designs.

The present invention will now be illustrated further with reference to the following Example.

Example

A panel-shaped moulding material having the general structure illustrated in FIG. 2 was provided. The moulding material was located in a mould tool having the general structure illustrated in FIG. 1. The glass fibre layer was located onto the moulding surface of the lower mould part. The surface resin layer faced the moulding surface of the upper mould part. The upper and lower mould parts were at an elevated temperature, greater than the resin curing temperature and about 10° C. lower than the Tg of the final cured resin, which in turn was greater than about 200° C.

The upper mould part was spaced from the upper major surface of the moulding material located on the lower mould part by a distance of 900 mm. The mould tool and moulding material were at atmospheric pressure, namely 1.01 bar.

The upper mould part was lowered at a closure rate of 300 mm per second to a spacing distance above the moulding material of 80 mm, immediately prior to which distance a vacuum seal between the upper and lower mould parts was engaged. A vacuum was pulled within the cavity formed between the upper and lower mould parts.

The upper mould part was then lowered at a closure rate of 25 mm per second to a spacing distance above the moulding material of 75 mm at which point the vacuum caused the pressure within the cavity to be 250 mbar absolute.

The upper mould part was then lowered at a closure rate of 3 mm per second, while the pressure continued to reduce in the cavity, to a spacing distance above the moulding material of 2 mm at which point the vacuum caused the pressure within the cavity to have reached 50 mbar absolute. At this point the intermediate cavity is formed above the surface resin layer while the vacuum pressure is lowered to the preset amount, in this case 50 mbar absolute, in order substantially completely to evacuate air from within the cavity.

Thereafter, the upper mould part was then lowered at a closure rate of 0.5 mm per second to contact and then compress the moulding material while the pressure within the cavity was 50 mbar absolute. The closure step terminated when the upper and lower mould parts were engaged to define the substantially closed mould cavity under the weight of mould tool and vacuum pressure.

The entire sequence up to forming the substantially closed mould cavity lasted for a period of only about 30 seconds.

The substantially closed mould was held at this position for about 60 seconds substantially to complete the resin impregnation.

Then the additional closure load of the press was initiated to complete the impregnation. This load was increased gradually from zero to 50 KN over a period of about 75 seconds. This was estimated to generate a 1.1 bar relative pressure on the moulding material when considering the applied force to act on the moulding material surface area. The load was then further increased in a gradual ramp from 501 KN to 600 KN over a period of about 90 seconds. This load potentially generates a 13.6 bar relative pressure on the moulding material when considering the applied force to act on the moulding material surface area.

Then the vacuum pressure was released, the mould cavity communicated with atmospheric pressure, and the applied force of 6001 KN was applied for a period of 1430 seconds in order fully to cure the resin.

The mould tool was then opened and the rigid and stable molded part was demoulded while still at an elevated temperature. No cooling of the molded part prior to cooling was required.

The resultant moulded part had a very high quality A-surface and a high quality B-surface.

Various modifications to the illustrated embodiments of the invention will be readily apparent to those skilled in the art.

The invention claimed is:

1. A method of press moulding a moulding material to form a moulded part of fibre-reinforced resin matrix composite material, the method comprising the steps of:
   i. providing a mould tool having a lower mould part and an upper mould part, the upper mould part having a first moulding surface for moulding a first moulded surface of the moulded part and the lower mould part having a second moulding surface for moulding a second moulded surface of the moulded part;
   ii. providing a multilaminar panel of moulding material comprising at least one layer of fibres and at least one layer of resin, the multilaminar panel having first and second opposite major surfaces;
   iii. locating the moulding material in the mould tool;
   iv. progressively closing the mould tool to define a substantially closed mould cavity containing the moulding material, the closing step including:
      a. a preliminary closing phase to achieve mutual engagement between the lower and upper mould parts,
      b. a secondary closing phase after engagement between the lower and upper mould parts with the mould tool partially closed to define a closed intermediate cavity containing the moulding material, the closed intermediate cavity being larger than the moulded part and the first moulding surface of the upper mould part being spaced from the first major surface by a spacing distance, in the secondary phase air being at least partially evacuated from the closed intermediate cavity while the first moulding surface of the upper mould part is spaced from the first major surface to provide a vacuum pressure, and
      c. a tertiary closing phase after the vacuum pressure has been provided in the closed intermediate cavity, the tertiary phase having:
         I. a first stage prior to both the first moulding surface contacting the first major surface and the second moulding surface contacting the second major surface, and
         II. a second compression stage after both the first moulding surface has contacted the first major surface and the second moulding surface has contacted the second major surface, the closure speed of relative movement between the lower and upper mould parts being higher in the first stage than in the second compression stage;
   v. applying pressure to the moulding material in the mould cavity to configure the moulding material in a fully moulded shape; and
   vi. substantially fully curing the resin to form a moulded part from the moulding material.

2. A method according to claim 1 wherein the at least one layer of fibres comprises at least one layer of dry fibres and the second compression stage causes resin impregnation of the dry fibres.

3. A method according to claim 1 wherein a dry fibre layer of the multilaminar panel forms the second major surface, in the locating step iii the second major surface is disposed on the second moulding surface of the lower mould part, and the lower mould part is at an elevated temperature as compared to the temperature of the moulding material, and after the applying pressure step v resin in the multilaminar panel fully impregnates the dry fibres.

4. A method according to claim 1 wherein prior to the closing step iv the lower and upper mould parts are initially separate, and at an end of preliminary closing phase in the closing step iv the lower and upper mould parts are mutually engaged to define an initial cavity containing the moulding material.

5. A method according to claim 4 wherein after the initial cavity has been formed the mould tool is continuously closed to form the substantially closed mould cavity.

6. A method according to claim 4 wherein after the initial cavity has been formed the mould tool is discontinuously closed, there being a dwell period at the spacing distance.

7. A method according to claim 1 wherein at the end of the preliminary closing phase a vacuum seal is engaged between the lower mould part and the upper mould part.

8. A method according to claim 7 wherein the vacuum seal is engaged when the first moulding surface of the upper mould part is spaced from the first major surface by a distance of from 10 to 100 mm.

9. A method according to claim 1 wherein in the second compression stage the closure speed is controlled so as to avoid excessive resin bleed out from the cavity, optionally to reduce any resin bleed out to no more than 600 grams of resin per square meter of the moulding material.

10. A method according to claim 1 wherein in the applying pressure step v the pressure is applied by gradually increasing the pressure.

11. A method according to claim 1 further comprising the steps of: vii. separating the upper and lower mould parts; and viii. removing the moulded part from the mould tool.

12. A method according to claim 11 wherein the method includes successive moulding cycles for moulding successive moulded parts and the locating step iii of a later cycle directly follows a removing step viii of an earlier cycle.

13. A method according to claim 1 wherein a vacuum pressure is applied during the closing step iv and the pressure applying step v.

14. A method according to claim 13 wherein the vacuum pressure is released during the curing step vi.

15. A method according to claim 1 wherein the method forms a vehicle body panel of fibre-reinforced resin matrix composite material, the vehicle body panel having a front A-surface and a rear B-surface, the mould is heated and the first moulding surface moulds a front A-surface of the vehicle body panel and the second moulding surface moulds a rear B-surface of the vehicle body panel, the vehicle body panel having a front A-surface formed from the first major surface and a rear B-surface formed from the second major surface.

16. A method according to claim 1 wherein the moulding material further comprises a syntactic layer comprising a polymer matrix and a plurality of hollow particles distributed within the polymer matrix.

17. A method according to claim 16 wherein the syntactic layer is a core layer between first and second dry fibre layers.

18. A method according to claim 16 wherein in locating step iii the moulding material drapes by bending about a neutral axis substantially centrally located with respect to the thickness of the moulding material, the neutral axis being located within the syntactic layer.

19. A method according to claim 1 wherein the resin comprises a thermosetting resin, optionally an epoxy resin.

20. A method according to claim 1 wherein in locating step iii the moulding material is heated to cause the viscosity of the resin initially to decrease as a result of an increase in resin temperature and then to increase as a result of initiation of curing prior to step vi.

21. A method according to claim 1 wherein in the locating step iii the second major surface is draped onto the second moulding surface.

22. A method according to claim 1 wherein locating step iii to curing step vi are carried out at an elevated temperature above the curing temperature of the resin.

23. A method according to claim 1 wherein in the locating step iii a reduced pressure is applied to the mould cavity to increase a drape of the moulding material.

24. A method according to claim 1 wherein in the moulding material a layer of carbon fibres is adjacent to a respective layer of resin.

25. A method according to claim 24 wherein the moulding material comprises a syntactic core layer between a first carbon fibre layer and a second dry glass fibre layer defining the second major surface, each fibre layer being adjacent to a layer of resin.

26. A method according to claim 25 wherein the surface resin layer is on the first major surface of the moulding material and is adjacent to the first carbon fibre layer.

27. A method according to claim 1 wherein the moulding material comprises the surface resin layer, a syntactic core layer, a carbon fibre layer and a first resin layer between the surface resin layer and the syntactic core layer, a dry glass fibre layer defining the second major surface, and a second resin layer between the syntactic core layer and the dry glass fibre layer.

28. A method according to claim 1 wherein the first moulding surface faces substantially downwardly and the second moulding surface faces substantially upwardly.

29. A method according to claim 1 wherein the moulding material located in the mould tool in the locating step iii has a greater thickness than the moulded part and the closing step iv compresses the moulding material in the substantially closed mould cavity prior to the applying pressure step v.

30. A method according to claim 1 wherein in the moulding material the at least one layer of resin comprises thermosetting resin and the at least one layer of fibres comprises a woven fabric of carbon or glass fibres, optionally at least one or each woven fabric being substantially unimpregnated with any resin.

31. A method according to claim 1 wherein in the moulding material the at least one layer of resin is adjacent to at least one layer of fibres, optionally at least one or each layer of fibres being substantially unimpregnated with any resin.

32. A method according to claim 1 wherein the moulding material does not comprise a sheet moulding compound (SMC).

* * * * *

UNITED STATES PATENT AND TRADEMARK OFFICE
CERTIFICATE OF CORRECTION

PATENT NO. : 9,981,429 B2  
APPLICATION NO. : 14/404664  
DATED : May 29, 2018  
INVENTOR(S) : Daniel Thomas Jones et al.

Page 1 of 1

It is certified that error appears in the above-identified patent and that said Letters Patent is hereby corrected as shown below:

On the Title Page

Item (73), Line 2:
Delete "Wright" and insert --Wight--.

Column 19, (Claim 20, Line 46):
Insert --the-- before the word "locating".

Signed and Sealed this
Third Day of July, 2018

Andrei Iancu
*Director of the United States Patent and Trademark Office*